United States Patent
Liu et al.

(10) Patent No.: US 11,801,195 B2
(45) Date of Patent: Oct. 31, 2023

(54) NEGATIVE PRESSURE MASSAGE APPARATUS AND METHOD THEREOF

(71) Applicant: BIBOTING INTERNATIONAL CO., LTD., Taoyuan (TW)

(72) Inventors: Shih-Ta Liu, Taoyuan (TW); Po-Chang Liu, Taoyuan (TW); Pei-En Lee, New Taipei (TW)

(73) Assignee: BIBOTING INTERNATIONAL CO., LTD., Taoyuan (TW)

( * ) Notice: Subject to any disclaimer, the term of this patent is extended or adjusted under 35 U.S.C. 154(b) by 155 days.

(21) Appl. No.: 17/535,376

(22) Filed: Nov. 24, 2021

(65) Prior Publication Data
US 2023/0157923 A1 May 25, 2023

(51) Int. Cl.
*A61H 9/00* (2006.01)
*F16K 31/06* (2006.01)

(52) U.S. Cl.
CPC ....... *A61H 9/0057* (2013.01); *F16K 31/0658* (2013.01); *A61H 2201/013* (2013.01); *A61H 2201/1238* (2013.01); *A61H 2201/1409* (2013.01); *A61H 2201/5071* (2013.01); *A61H 2201/5087* (2013.01); *Y10T 137/86083* (2015.04)

(58) Field of Classification Search
CPC ........... F16K 31/0658; Y10T 137/2546; Y10T 137/86083; Y10T 137/86413; A61H 9/0057; A61H 1/00; A61H 2201/013; A61H 2201/1238; A61H 2201/1409; A61H 2201/5071; A61H 2201/5087
See application file for complete search history.

(56) References Cited

U.S. PATENT DOCUMENTS

| | | | | |
|---|---|---|---|---|
| 4,748,973 A | * | 6/1988 | Cho | A61H 9/005 601/14 |
| 7,682,321 B2 | * | 3/2010 | Naldoni | A61H 9/0078 601/6 |
| 2007/0027411 A1 | * | 2/2007 | Ella | A61H 9/005 601/7 |

(Continued)

FOREIGN PATENT DOCUMENTS

| CN | 2502687 Y | 7/2002 |
|---|---|---|
| CN | 2841017 Y | 11/2006 |

(Continued)

OTHER PUBLICATIONS

Office Action dated May 23, 2022 of the corresponding Taiwan patent application No. 110139249.

(Continued)

*Primary Examiner* — Matthew W Jellett
(74) *Attorney, Agent, or Firm* — Chun-Ming Shih; HDLS IPR SERVICES (57) ABSTRACT

A negative pressure massage apparatus includes a vacuum pump, two solenoid valves and a control board. The vacuum pump is used to generate a negative pressure outside the negative pressure massage apparatus. Two solenoid valves are used to control a gas flow input into the negative pressure massage apparatus. The control board is used to activate or stop at least one of the vacuum pumps, and the two solenoid valves. The present disclosure further includes a method of using the negative pressure massage apparatus.

10 Claims, 4 Drawing Sheets

(56) References Cited

U.S. PATENT DOCUMENTS

2009/0312675 A1 * 12/2009 Sampson ............... A61H 9/005
601/10

FOREIGN PATENT DOCUMENTS

| | | | |
|---|---|---|---|
| CN | 202397867 U | 8/2012 | |
| CN | 108309716 A | 7/2018 | |
| CN | 108309719 A | 7/2018 | |
| CN | 209347919 U | 9/2019 | |
| CN | 112312874 A * | 2/2021 | ............ A61H 7/008 |
| CN | 112312874 A | 2/2021 | |
| CN | 112545855 A | 3/2021 | |
| CN | 113893151 A | 1/2022 | |

OTHER PUBLICATIONS

Search Report dated Jun. 23, 2022 of the corresponding PCT patent application No. PCT/CN2021/127479.

* cited by examiner

NEGATIVE PRESSURE MASSAGE APPARATUS AND METHOD THEREOF

BACKGROUND

Technical Field

The present disclosure is related to a negative pressure massage apparatus, in particular to a negative pressure massage apparatus that includes two solenoid valves and has multiple modes.

Description of Related Art

In recent years, under a highly industrialized and informatized society, people generally lack exercise. For example, using a computer to go to work, watching TV, playing video games, flying on an airplane and other occasions, they all maintain a long sitting posture, forming a bad posture. In people's daily life, the muscles of the head, neck, shoulders, chest, buttocks, or abdomen are in a state of tension, which leads to tension headaches, which makes the neck and shoulders feel pain, and also hinders the smoothness of the brain. The blood circulation makes people often feel tired and unable to concentrate.

In today's society, people often face various challenges and great spiritual pressures, so that timely release of pressure becomes an important part of life, which may not only effectively change the mood at work, but also continue to accept more challenges in the future. Many people use massage to achieve physical and spiritual relaxation. Massage may increase the temperature of skin and accelerate blood circulation, so that the blood vessels in body may dilate to achieve a soothing effect on the body and mind, and it may promote metabolism and blood circulation in the body. And blood circulation will get better and better.

With the faster and faster pace of life, modern people often do not have enough time to exercise to relax their minds and bodies, or accumulate a lot of stress that needs to be relieved. In order to allow people to relax and rest in some limited free time, many kinds of massage and pressure relief devices, such as negative pressure massage apparatus, have appeared on the market. A related art negative pressure massage apparatus includes a main unit, a hose, and a vacuum cup. Two ends of the hose are connected to the main unit and the vacuum cup respectively. A user may control the vacuum cup through the main unit to pump or exhaust on skin surface, so as to achieve an effect of massage and relaxation.

However, the related art negative pressure massage apparatus only has a simple pumping or exhausting function. Due to the different physiological structures and organ positions of various parts of the human body, general negative pressure massage apparatus is not only difficult to optimally adapt to the massage state of each part of the human body, but also difficult to adapt to different objects to be massaged. (e.g., elders and children, boys and girls, etc.). It not only causes troubles in operation, but also increases a cost of manufacturing equipment and massage.

Therefore, how to design a negative pressure massage apparatus and a method thereof, in particular to solve the aforementioned technical problems of the prior art, is an important subject studied by the inventor of the present disclosure.

SUMMARY

A purpose of the present disclosure is to provide a negative pressure massage apparatus, which solves a technical problem in the prior art that it is difficult to best fit a massage state of various parts of a human body or an object being massaged. To achieve a purpose of saving costs and improving efficiency.

In order to achieve the purpose of the present disclosure, the negative pressure massage apparatus includes a vacuum pump, a first solenoid valve, a second solenoid valve, and a control board. The vacuum pump generates a negative pressure outside the negative pressure massage apparatus. The first solenoid valve is connected to the vacuum pump, and the first solenoid valve is used to control a gas flow input into the negative pressure massage apparatus from outside the negative pressure massage apparatus to a first flow rate. The second solenoid valve is connected to the vacuum pump and the first solenoid valve, and the second solenoid valve is used to control the gas flow input into the negative pressure massage apparatus from outside the negative pressure massage apparatus to a second flow rate. The control board is connected to the vacuum pump, the first solenoid valve and the second solenoid valve. The control board is used to activate or stop at least one of the vacuum pumps, the first solenoid valve and the second solenoid valve.

Further, in the negative pressure massage apparatus, the first flow rate is less than or equal to the second flow rate.

Further, the negative pressure massage apparatus further includes a communication pipe connected to the vacuum pump, the first solenoid valve, the second solenoid valve, and outside the negative pressure massage apparatus.

Further, the negative pressure massage apparatus further includes a negative pressure cup connected to the communication pipe outside the negative pressure massage apparatus, and the negative pressure is generated in the negative pressure cup.

Further, in the negative pressure massage apparatus, the control board includes a control unit, the control unit is connected to the vacuum pump, the first solenoid valve and the second solenoid valve. The control unit is used to activate or stop at least one of the vacuum pumps, the first solenoid valve and the second solenoid valve.

Further, in the negative pressure massage apparatus, the control board further includes a storage unit connected to the control unit, and the storage unit stores a control parameter, the control unit is used to activate or stop at least one of the vacuum pumps, the first solenoid valve and the second solenoid valve according to the control parameter.

Another purpose of the present disclosure is to provide a method of using a negative pressure massage apparatus, which solves a technical problem in the prior art that it is difficult to best fit a massage state of various parts of a human body or an object being massaged. To achieve the purpose of saving costs and improving efficiency.

In order to achieve the purpose of the present disclosure, the negative pressure massage apparatus includes a vacuum pump, a first solenoid valve, and a second solenoid valve, the method includes following steps:

The vacuum pump is continuously activated, and both the first solenoid valve and the second solenoid valve are continuously stopped to shut off the gas flow from outside the negative pressure massage apparatus into the negative pressure massage apparatus. The vacuum pump generates a first negative pressure that is stable over time outside the negative pressure massage apparatus.

Alternately activate the vacuum pump or the first solenoid valve over time, and the second solenoid valve is continuously stopped, the first solenoid valve is used to control the gas flow input into the negative pressure massage apparatus from outside the negative pressure massage apparatus to a first flow rate. The vacuum pump and the first solenoid valve generate a second negative pressure that changes with time outside the negative pressure massage apparatus.

Alternately activate the vacuum pump or the second solenoid valve over time, or alternately activate the vacuum pump or both the first solenoid valve and the second solenoid valve over time. The second solenoid valve is used to control the gas flow input into the negative pressure massage apparatus from outside the negative pressure massage apparatus to a second flow rate, and at least one of the vacuum pumps, the second solenoid valve, and the first solenoid valve generates a third negative pressure that changes with time outside the negative pressure massage apparatus.

The vacuum pump is continuously activated, the first solenoid valve is alternately activated, and the second solenoid valve is continuously stopped. The first solenoid valve is used to control the gas flow input into the negative pressure massage apparatus from outside the negative pressure massage apparatus to the first flow rate. The vacuum pump and the first solenoid valve generate a fourth negative pressure that changes with time outside the negative pressure massage apparatus.

The vacuum pump is continuously activated, the second solenoid valve is alternately activated, and the first solenoid valve is continuously stopped. The second solenoid valve is used to control the gas flow input into the negative pressure massage apparatus from outside the negative pressure massage apparatus to the second flow rate. The vacuum pump and the second solenoid valve generate a fifth negative pressure that changes with time outside the negative pressure massage apparatus.

Further, the method of using the negative pressure massage apparatus further includes following step: the vacuum pump is continuously activated, both the first solenoid valve and the second solenoid valve are alternately activated. The first solenoid valve and the second solenoid valve are used to control the gas flow input into the negative pressure massage apparatus from outside the negative pressure massage apparatus to a sum of the first flow rate and the second flow rate. The vacuum pump, the first solenoid valve and the second solenoid valve generate a sixth negative pressure that changes with time outside the negative pressure massage apparatus.

Further, in the method of using the negative pressure massage apparatus, the first flow rate is less than or equal to the second flow rate.

Further, in the method of using the negative pressure massage apparatus, an activation time of the vacuum pump, the first solenoid valve or the second solenoid valve is greater than 0 seconds and less than or equal to 9.9 seconds.

Further, in the method of using the negative pressure massage apparatus, a pressure value generated by the vacuum pump is between −40 Torr and −600 Torr.

When using the negative pressure massage apparatus of the present disclosure, the vacuum pump, the first solenoid valve, and the second solenoid valve are controlled to activate or stop by the control board, so that they may be activated continuously or alternately over time. When the first solenoid valve and the second solenoid valve are respectively used to control the first flow rate and the second flow rate that are different from each other, the control board performs flow control by activating the first solenoid valve alone, or by activating the second solenoid valve alone, or by activating both the first solenoid valve and second solenoid valve at the same time. The control board may be matched with the vacuum pump to be activated continuously or alternately activated with any solenoid valve over time to achieve more diversified negative pressure changes over time, so as to achieve different massage effects and purposes for different application effects.

For this reason, the negative pressure massage apparatus and the method thereof of the present disclosure solves the technical problem in the prior art that it is difficult to best fit a massage state of various parts of a human body or an object being massaged. To achieve the purpose of saving costs and improving efficiency.

In order to further understand the techniques, means, and effects of the present disclosure for achieving the intended purpose. Please refer to the following detailed description and drawings of the present disclosure. The drawings are provided for reference and description only, and are not intended to limit the present disclosure.

DETAILED DESCRIPTION

The following are specific examples to illustrate the implementation of a "negative pressure massage apparatus" of the present disclosure. A person skilled in the art may understand the advantages and effects of the present disclosure from the content disclosed in this specification. The present disclosure may be implemented or applied through other different specific embodiments, and various details in this specification may also be based on different viewpoints and applications, and various modifications and changes may be made without departing from the concept of the present disclosure.

It should be understood that the structures, the proportions, the sizes, the number of components, and the like in the drawings are only used to cope with the contents disclosed in the specification for understanding and reading by those skilled in the art, and it is not intended to limit the conditions that may be implemented in the present disclosure, and thus is not technically significant. Any modification of the structure, the change of the proportional relationship, or the adjustment of the size, should be within the scope of the technical contents disclosed by the present disclosure without affecting the effects and the achievable effects of the present disclosure.

The technical content and detailed description of the present disclosure will be described below in conjunction with the drawings.

Figure 1:
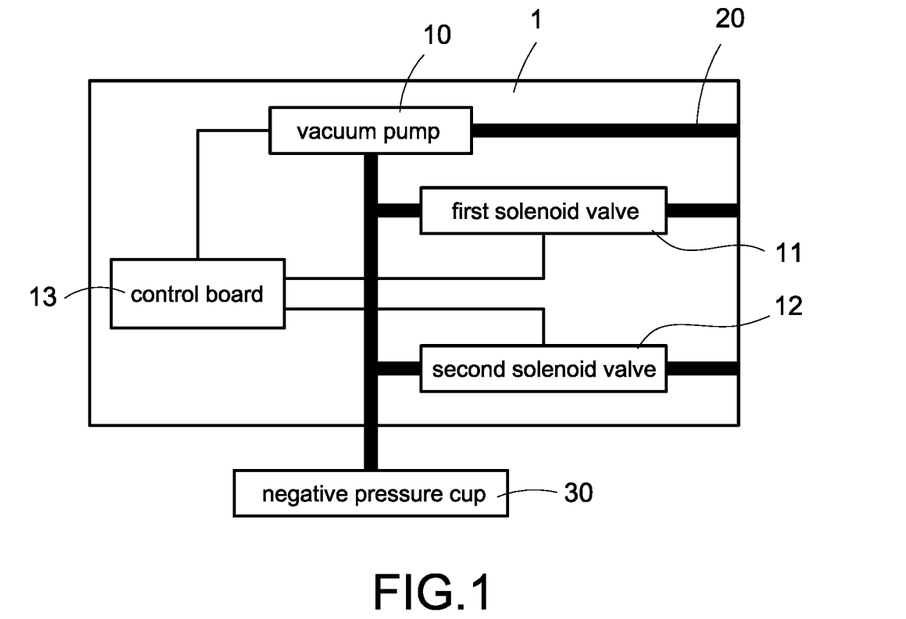
FIG. 1 is a system architecture diagram of a first embodiment of a negative pressure massage apparatus of the present disclosure.

Please refer to FIG. 1, FIG. 1 is a system architecture diagram of a first embodiment of a negative pressure massage apparatus of the present disclosure. The negative pressure massage apparatus 1 includes a vacuum pump 10, a first solenoid valve 11, a second solenoid valve 12, and a control board 13. The vacuum pump 10 generates a negative pressure outside the negative pressure massage apparatus 1. The first solenoid valve 11 is connected to the vacuum pump 10, and the first solenoid valve 11 is used to control a gas flow input into the negative pressure massage apparatus 1 from outside the negative pressure massage apparatus 1 to a first flow rate. The second solenoid valve 12 is connected to the vacuum pump 10 and the first solenoid valve 11, and the second solenoid valve 12 is used to control the gas flow input into the negative pressure massage apparatus 1 from outside the negative pressure massage apparatus 1 to a second flow rate. The control board 13 is connected to the vacuum pump 10, the first solenoid valve 11 and the second solenoid valve 12. The control board 13 is used to activate or stop at least one of the vacuum pump 10, the first solenoid valve 11 and the second solenoid valve 12.

Further, the first flow rate is less than or equal to the second flow rate. The negative pressure massage apparatus 1 further includes a communication pipe 20 and a negative pressure cup 30. The communication pipe 20 connects to the vacuum pump 10, the first solenoid valve 11, the second solenoid valve 12, and outside the negative pressure massage apparatus 1. The negative pressure cup 30 connects to the communication pipe 20 outside the negative pressure massage apparatus 1, and the negative pressure is generated in the negative pressure cup 30.

Figure 2:
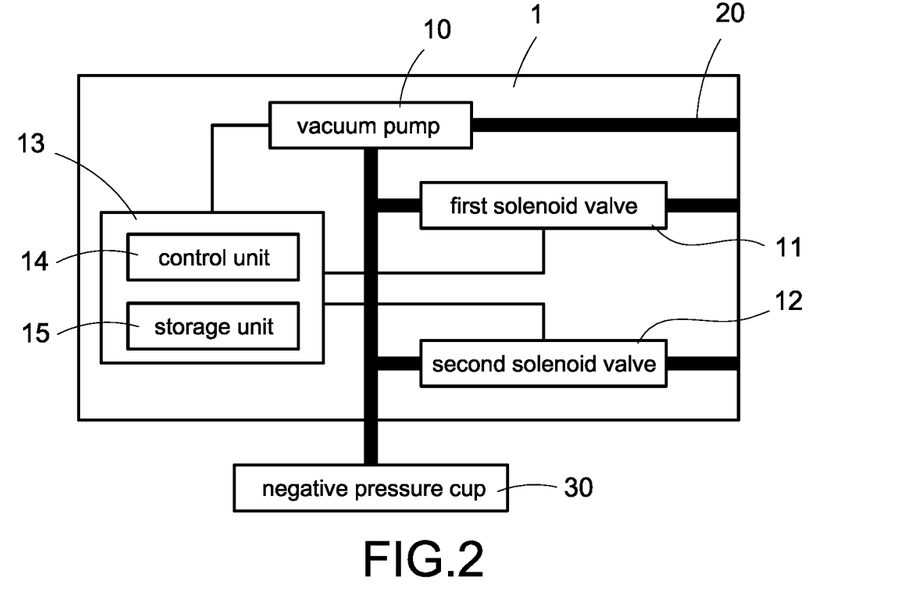
FIG. 2 is a system architecture diagram of a second embodiment of the negative pressure massage apparatus of the present disclosure.

Please refer to FIG. 2, FIG. 2 is a system architecture diagram of a second embodiment of the negative pressure massage apparatus of the present disclosure. The second embodiment of the present disclosure is substantially the same as the first embodiment aforementioned, except that the control board 13 includes a control unit 14 and a storage unit 15. The control unit 14 is connected to the vacuum pump 10, the first solenoid valve 11 and the second solenoid valve 12, and the control unit 14 is used to activate or stop at least one of the vacuum pump 10, the first solenoid valve 11 and the second solenoid valve 12. The storage unit 15 is connected to the control unit 14, and the storage unit 15, and the storage unit 15 stores control parameters. The control unit 14 activates or stops at least one of the vacuum pump 10, the first solenoid valve 11 and the second solenoid valve 12 according to the control parameters.

Figure 3:
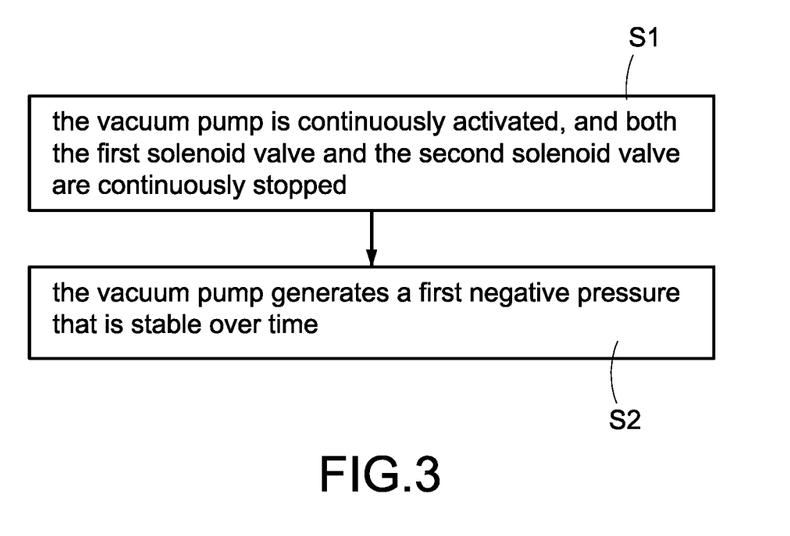
FIG. 3 is a flowchart of a first mode of the negative pressure massage apparatus of the present disclosure.
Figure 4:
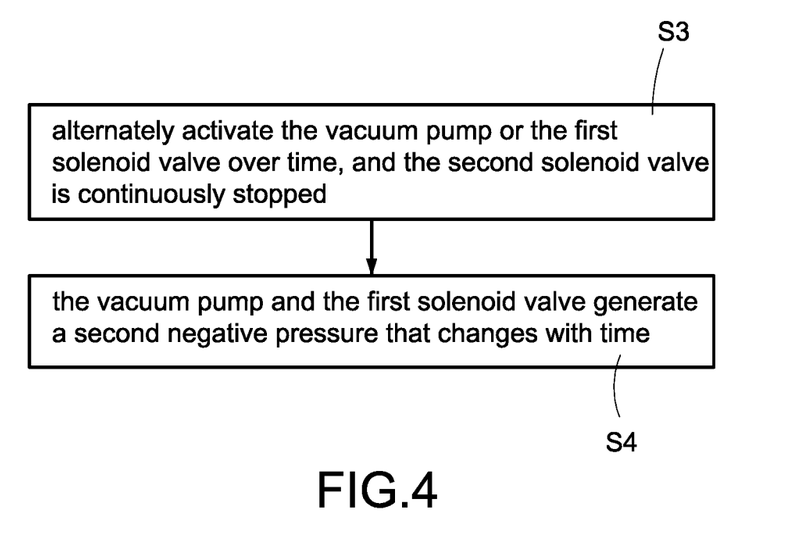
FIG. 4 is a flowchart of a second mode of the negative pressure massage apparatus of the present disclosure.
Figure 5:
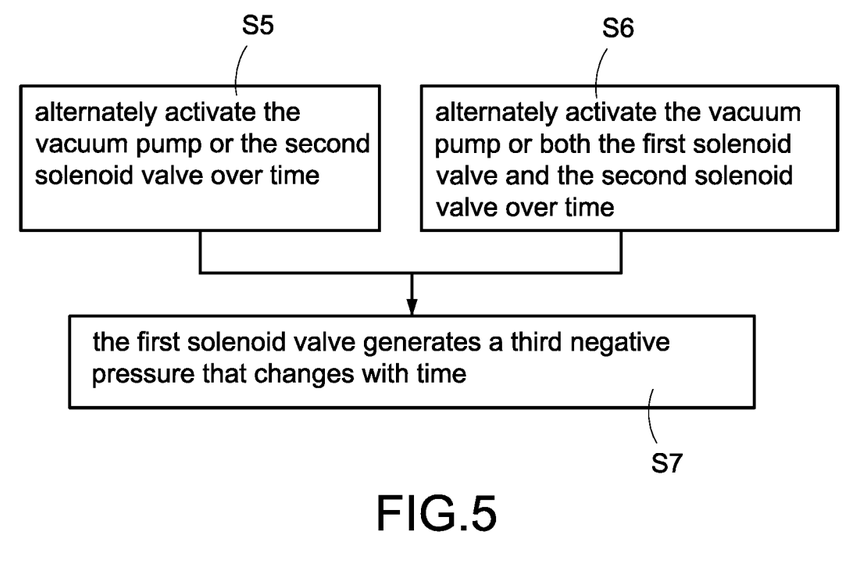
FIG. 5 is a flowchart of a third mode of the negative pressure massage apparatus of the present disclosure.
Figure 6:
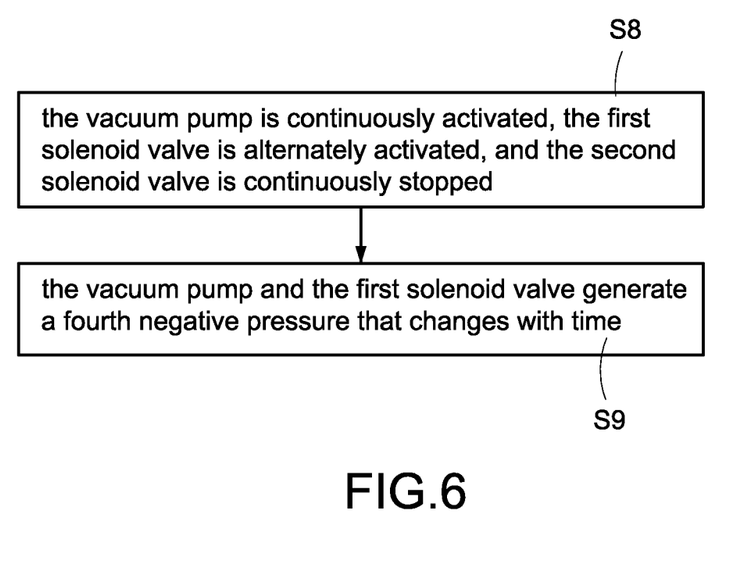
FIG. 6 is a flowchart of a fourth mode of the negative pressure massage apparatus of the present disclosure.
Figure 7:
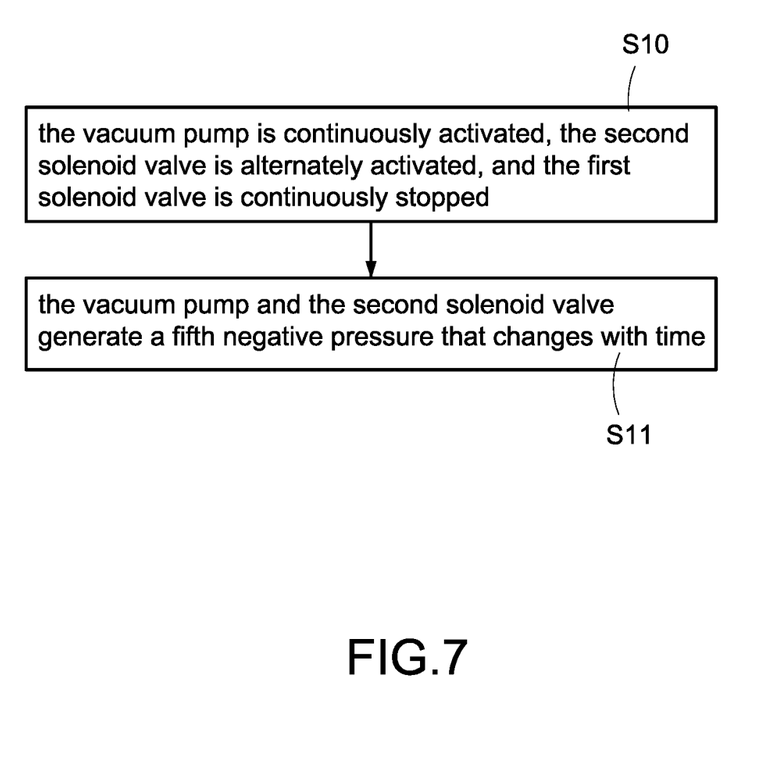
FIG. 7 is a flowchart of a fifth mode of the negative pressure massage apparatus of the present disclosure.

Please refer to FIG. 3 to FIG. 7. FIG. 3 is a flowchart of a first mode of the negative pressure massage apparatus of the present disclosure. FIG. 4 is a flowchart of a second mode of the negative pressure massage apparatus of the present disclosure. The FIG. 5 is a flowchart of a third mode of the negative pressure massage apparatus of the present disclosure. FIG. 6 is a flowchart of a fourth mode of the negative pressure massage apparatus of the present disclosure. FIG. 7 is a flowchart of a fifth mode of the negative pressure massage apparatus of the present disclosure. Moreover, the reference numbers of the negative pressure massage apparatus 1 are as described above, and will not be repeated here.

As shown in FIG. 3, in the first mode, the vacuum pump 10 is continuously activated, and both the first solenoid valve 11 and the second solenoid valve 12 are continuously stopped (step S1) to shut off the gas flow from outside the negative pressure massage apparatus 1 into the negative pressure massage apparatus 1. The vacuum pump 10 generates a first negative pressure 11 that is stable over time outside the negative pressure massage apparatus 1 (step S2). At this time, the vacuum pump 10 continuously generates the negative pressure in the negative pressure cup 30.

As shown in FIG. 4, in the second mode, it alternately activates the vacuum pump 10 or the first solenoid valve 11 over time, and the second solenoid valve 12 is continuously stopped (step S3). The first solenoid valve 11 is used to control the gas flow input into the negative pressure massage apparatus 1 from outside the negative pressure massage apparatus 1 to the first flow rate. The vacuum pump 10 and the first solenoid valve 11 generate a second negative pressure that changes with time outside the negative pressure massage apparatus 1 (step S4). At this time, the vacuum pump 10 generates or restores the negative pressure generated in the negative pressure cup 30 within a time, and the first solenoid valve 11 weakens the negative pressure in the negative pressure cup 30 at another time.

As shown in FIG. 5, in the third mode, it alternately activates the vacuum pump 10 or the second solenoid valve 12 over time (step S5), or alternately activates the vacuum pump 10 or both the first solenoid valve 11 and the second solenoid valve 12 over time (step S6). The second solenoid valve 12 is used to control the gas flow input into the negative pressure massage apparatus 1 from outside the negative pressure massage apparatus 1 to a second flow rate, and at least one of the vacuum pump 10, the second solenoid valve 12. The first solenoid valve 11 generates a third negative pressure that changes with time outside the negative pressure massage apparatus 1 (step S7). At this time, the vacuum pump 10 generates or restores the negative pressure within the negative pressure cup 30 within a time, and at least one of the first solenoid valve 11 or the second solenoid valve 12 weakens the negative pressure in the negative pressure cup 30 at another time.

As shown in FIG. 6, in the fourth mode, the vacuum pump 10 is continuously activated, the first solenoid valve 11 is intermittently activated, and the second solenoid valve 12 is continuously stopped (step S8). The first solenoid valve 11 is used to control the gas flow input into the negative pressure massage apparatus 1 from outside the negative pressure massage apparatus 1 to the first flow rate. The vacuum pump 10 and the first solenoid valve 11 generate a fourth negative pressure that changes with time outside the negative pressure massage apparatus 1 (step S9). The alternative activation has a time ratio about on/off of the first solenoid valve 11. At this time, the vacuum pump 10 continuously generates the negative pressure in the negative pressure cup 30, and at the same time, the first solenoid valve 11 is intermittently activated with time so that the negative pressure in the negative pressure cup 30 continuously changes with time.

As shown in FIG. 7, in the fifth mode, the vacuum pump 10 is intermittently activated, the second solenoid valve 12 is alternately activated, and the first solenoid valve 11 is continuously stopped (step S10). The second solenoid valve 12 is used to control the gas flow input into the negative pressure massage apparatus 1 from outside the negative pressure massage apparatus 1 to the second flow rate. The vacuum pump 10 and the second solenoid valve 12 generate a fifth negative pressure that changes with time outside the negative pressure massage apparatus 1 (step S11). The first flow rate is less than or equal to the second flow rate. At this time, the vacuum pump 10 continuously generates the negative pressure in the negative pressure cup 30, and at the same time, the second solenoid valve 12 is intermittently activated with time so that the negative pressure in the negative pressure cup 30 continuously changes with time.

A method of using the negative pressure massage apparatus 1 further includes following step: the vacuum pump 10 is continuously activated, both the first solenoid valve 11 and the second solenoid valve 12 are intermittently activated. The first solenoid valve 11 and the second solenoid valve 12 are used to control the gas flow input into the negative pressure massage apparatus 1 from outside the negative pressure massage apparatus 1 to a sum of the first flow rate and the second flow rate. The vacuum pump 10, the first solenoid valve 11 and the second solenoid valve 12 generate a sixth negative pressure that changes with time outside the negative pressure massage apparatus 1.

Further, an activation time of the vacuum pump 10, the first solenoid valve 11 or the second solenoid valve 12 is greater than 0 seconds and less than or equal to 9.9 seconds. A pressure value generated by the vacuum pump 10 is between −40 Torr and −600 Torr.

In the method of using the negative pressure massage apparatus, if the continuous activation time of the vacuum pump 10 is X, and the intermittent activation time of the first solenoid valve 11 or the second solenoid valve 12 is Y (the X and Y are independent on time axis and do not affect each other), the negative pressure massage device 1 may have the following suggested implementation modes according to parts of human body that are massaged:

(1). Chest: the first mode or the third mode (X=2.0~2.4 seconds, Y=0.6~1.0 seconds);
(2). Buttocks: the first mode, or the third mode (X=2.4~3.0 seconds, Y=0.6~1.5 seconds);
(3). Shoulder and neck: the fourth mode (X=2.2~2.4 seconds, Y=0.6~1.2 seconds) or the
fifth mode (X=2.2~2.4 seconds, Y=0.6~1.2 seconds);
(4). Abdomen: the first mode or the third mode (X=1.6~2.4 seconds, Y=0.6~1.0 seconds);
(5). Face: the fourth mode (X=2.2~2.4 seconds, Y=0.6~1.2 seconds) or the fifth mode
(X=0.1~0.2 seconds, Y=0.1~0.2 seconds);
(6). Women's privacy: the fourth mode (X=0.1~0.2 seconds, Y=0.1~0.2 seconds).

When using the negative pressure massage apparatus of the present disclosure, the vacuum pump 10, the first solenoid valve 11, and the second solenoid valve 12 are controlled to activate or stop by the control board 13, so that they may be activated continuously or alternately over time. When the first solenoid valve 11 and the second solenoid valve 12 are respectively used to control the first flow rate and the second flow rate that are different from each other, the control board 13 performs flow control by activating the first solenoid valve 11 alone, or by activating the second solenoid valve 12 alone, or by activating both the first solenoid valve 11 and second solenoid valve 12 at the same time. The control board 13 may be matched with the vacuum pump 10 to be activated continuously or alternately activated with any solenoid valve over time to achieve more diversified negative pressure changes over time, so as to achieve different massage effects and purposes for different application effects.

For this reason, the negative pressure massage apparatus and the method thereof of the present disclosure solves the technical problem in the prior art that it is difficult to best fit a massage state of various parts of a human body or an object being massaged. To achieve the purpose of saving costs and improving efficiency.

The above is only a detailed description and drawings of the preferred embodiments of the present disclosure, but the features of the present disclosure are not limited thereto, and are not intended to limit the present disclosure. All the scope of the present disclosure shall be subject to the scope of the following claims. The embodiments of the spirit of the present disclosure and its similar variations are intended to be included in the scope of the present disclosure. Any variation or modification that may be easily conceived by those skilled in the art in the field of the present disclosure may be covered by the following claims.

What is claimed is:

1. A negative pressure massage apparatus comprising:
   a vacuum pump configured to generate a negative pressure outside the negative pressure massage apparatus;
   a first solenoid valve connected to the vacuum pump, and the first solenoid valve used to control a gas flow input into the negative pressure massage apparatus from outside the negative pressure massage apparatus to a first flow rate;
   a second solenoid valve connected to the vacuum pump and the first solenoid valve, and the second solenoid valve used to control the gas flow input into the negative pressure massage apparatus from outside the negative pressure massage apparatus to a second flow rate; and
   a control board connected to the vacuum pump, the first solenoid valve and the second solenoid valve, and the control board used to activate or stop at least one of the vacuum pumps, the first solenoid valve and the second solenoid valve,
   wherein, a continuous activation time of the vacuum pump is X, and an intermittent activation time of the first solenoid valve or the second solenoid valve is Y,
   a plurality of implementation modes to parts of a human body are:
   chest: X=2.0-2.4 seconds, Y=0.6-1.0 seconds;
   buttocks: X=2.4-3.0 seconds, Y=0.6-1.5 seconds; and
   abdomen: X=1.6-2.4 seconds, Y=0.6-1.0 seconds.

2. The negative pressure massage apparatus in claim 1, wherein, the first flow rate is less than or equal to the second flow rate.

3. The negative pressure massage apparatus in claim 1, further comprising a communication pipe connected to the vacuum pump, the first solenoid valve, the second solenoid valve, and outside the negative pressure massage apparatus.

4. The negative pressure massage apparatus in claim 3, further comprising a negative pressure cup connected to the communication pipe outside the negative pressure massage apparatus, and the negative pressure configured to generate in the negative pressure cup.

5. The negative pressure massage apparatus in claim 1, wherein, the control board comprises a control unit, the control unit is connected to the vacuum pump, the first solenoid valve and the second solenoid valve, and the control unit is used to activate or stop at least one of the vacuum pumps, the first solenoid valve and the second solenoid valve.

6. The negative pressure massage apparatus in claim 5, wherein, the control board further comprises a storage unit connected to the control unit, and the storage unit is configured to store a control parameter, the control unit is used to activate or stop at least one of the vacuum pumps, the first solenoid valve and the second solenoid valve according to the control parameter.

7. A method of using a negative pressure massage apparatus, the negative pressure massage apparatus comprising a vacuum pump, a first solenoid valve, and a second solenoid valve, the method comprising:
   continuously activating the vacuum pump, and continuously stopping both the first solenoid valve and the second solenoid valve to shut off the gas flow from outside the negative pressure massage apparatus into the negative pressure massage apparatus, and the vacuum pump configured to generate a first negative pressure that is stable over time outside the negative pressure massage apparatus;

alternately activating the vacuum pump or the first solenoid valve over time, and continuously stopping the second solenoid valve, the first solenoid valve used to control the gas flow input into the negative pressure massage apparatus from outside the negative pressure massage apparatus to a first flow rate, and the vacuum pump and the first solenoid valve configured to generate a second negative pressure that changes with time outside the negative pressure massage apparatus;

alternately activating the vacuum pump or the second solenoid valve over time, or alternately activating the vacuum pump or both the first solenoid valve and the second solenoid valve over time; the second solenoid valve used to control the gas flow input into the negative pressure massage apparatus from outside the negative pressure massage apparatus to a second flow rate, the vacuum pump and at least one of the second solenoid valve and the first solenoid valve configured to generate a third negative pressure that changes with time outside the negative pressure massage apparatus;

continuously activating the vacuum pump, intermittently activating the first solenoid valve, and continuously stopping the second solenoid valve; the first solenoid valve used to control the gas flow input into the negative pressure massage apparatus from outside the negative pressure massage apparatus to the first flow rate, and the vacuum pump and the first solenoid valve configured to generate a fourth negative pressure that changes with time outside the negative pressure massage apparatus; and continuously activating the vacuum pump, intermittently activating the second solenoid valve, and continuously stopping the first solenoid valve; the second solenoid valve used to control the gas flow input into the negative pressure massage apparatus from outside the negative pressure massage apparatus to the second flow rate, and the vacuum pump and the second solenoid valve configured to generate a fifth negative pressure that changes with time outside the negative pressure massage apparatus, wherein, a continuous activation time of the vacuum pump is X, and an intermittent activation time of the first solenoid valve or the second solenoid valve is Y, a plurality of implementation modes to parts of a human body are:

chest: the first negative pressure or the third negative pressure (X=2.0-2.4 seconds, Y=0.6-1.0 seconds);

buttocks: the first negative pressure or the third negative pressure (X=2.4-3.0 seconds, Y=0.6-1.5 seconds); and abdomen: the first negative pressure or the third negative pressure (X=1.6-2.4 seconds, Y=0.6-1.0 seconds).

8. The negative pressure massage apparatus in claim 7, further comprising following step:

activating continuously, by the vacuum pump, both the first solenoid valve and the second solenoid valve alternately activated; the first solenoid valve and the second solenoid valve used to control the gas flow input into the negative pressure massage apparatus from outside the negative pressure massage apparatus to a sum of the first flow rate and the second flow rate, and the vacuum pump, the first solenoid valve and the second solenoid valve configured to generate a sixth negative pressure that changes with time outside the negative pressure massage apparatus.

9. The negative pressure massage apparatus in claim 7, wherein, the first flow rate is less than or equal to the second flow rate.

10. The negative pressure massage apparatus in claim 7, wherein, a pressure value generated by the vacuum pump is between −40 Torr and −600 Torr.

* * * * *